April 23, 1957   R. O. AARVOLD   2,789,525
DEVICE FOR COVERING HATCH OPENINGS
Filed Sept. 12, 1955   3 Sheets-Sheet 1

BY:
Reinhardt Olai Aarvold

Pierce Scheffler & Parker
HIS ATTORNEYS

April 23, 1957  R. O. AARVOLD  2,789,525
DEVICE FOR COVERING HATCH OPENINGS
Filed Sept. 12, 1955  3 Sheets-Sheet 2

April 23, 1957 — R. O. AARVOLD — 2,789,525
DEVICE FOR COVERING HATCH OPENINGS
Filed Sept. 12, 1955 — 3 Sheets-Sheet 3
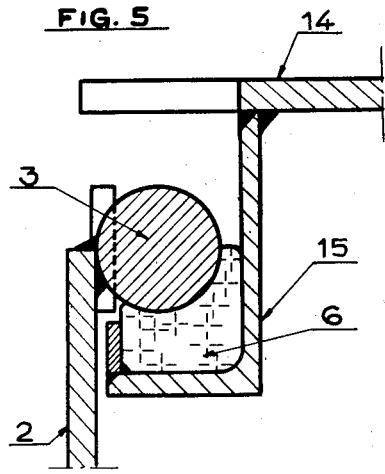
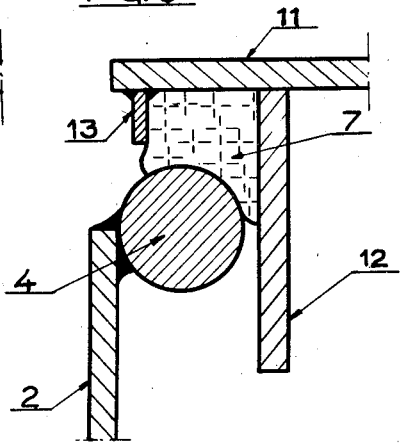
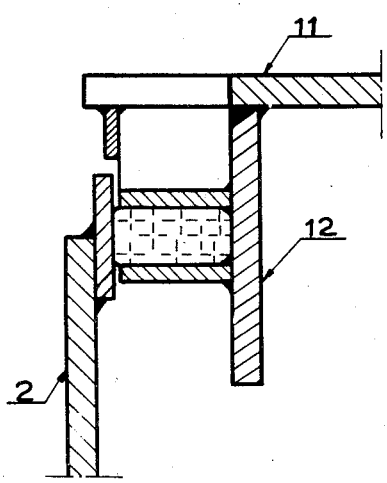
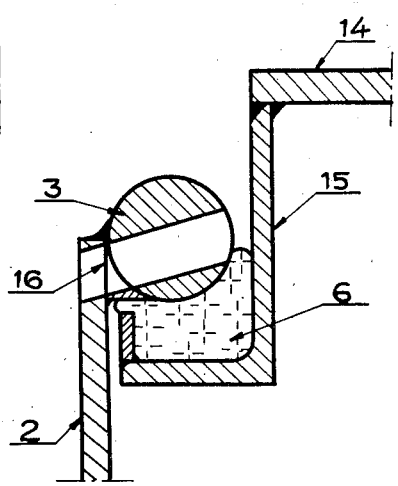

United States Patent Office 2,789,525
Patented Apr. 23, 1957

2,789,525

DEVICE FOR COVERING HATCH OPENINGS

Reinhardt Olai Aarvold, Goteborg, Sweden, assignor to Aktiebolaget Götaverken, Goteborg, Sweden, a corporation of Sweden Application September 12, 1955, Serial No. 533,827

Claims priority, application Sweden September 18, 1954

5 Claims. (Cl. 114—201)

This invention relates to a device for covering openings, such as entries or hatchways in tankers, containers and the like, in which the movable parts are desired to be easily handled and in which a tight seal should be obtained in the closed position of the cover.

Entries or hatchways in tankers or the like vessels generally have a longitudinally extended shape, the cover being usually mounted on hinges extending along one long side of the opening. Modern types of such covering devices are provided with a shutting device which can be used as an auxiliary for opening the cover, but I have found that the construction may be further simplified by mounting the cover for angular displacement about a central axis in a manner such that the halves of the cover balance each other and that the opening is uncovered when the cover is moved into a vertical position in the opening itself.

Due to this arrangement, very small forces are required to handle the cover which can be closed by means of a single bolt or a very few number of bolts. In an opening of ordinary size and with the cover placed in a vertical position therein, one half of the opening provides for sufficient space to enter the tank. In the other half, implements, ventilation shafts or similar accessories may be provided or taken down therethrough.

In pivotally mounted covering devices of the type hitherto used, certain difficulties are involved in obtaining a sufficiently effective seal at the places close to the axis of angular displacement. Since there are high requirements as to perfect sealing of the cover, the present construction may be devised in such a manner that the cover is mounted on pivots which are provided on supporting members projecting outward from the cover and from the coaming provided around the opening such that the pivots are located outwardly of abutments on the coaming, thereby enabling a packing which engages said abutments to extend without interruption past said pivots.

Figure 1:
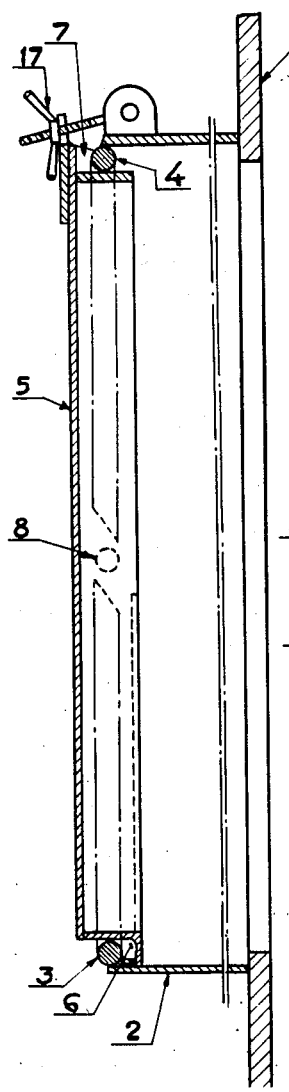
Figure 2:
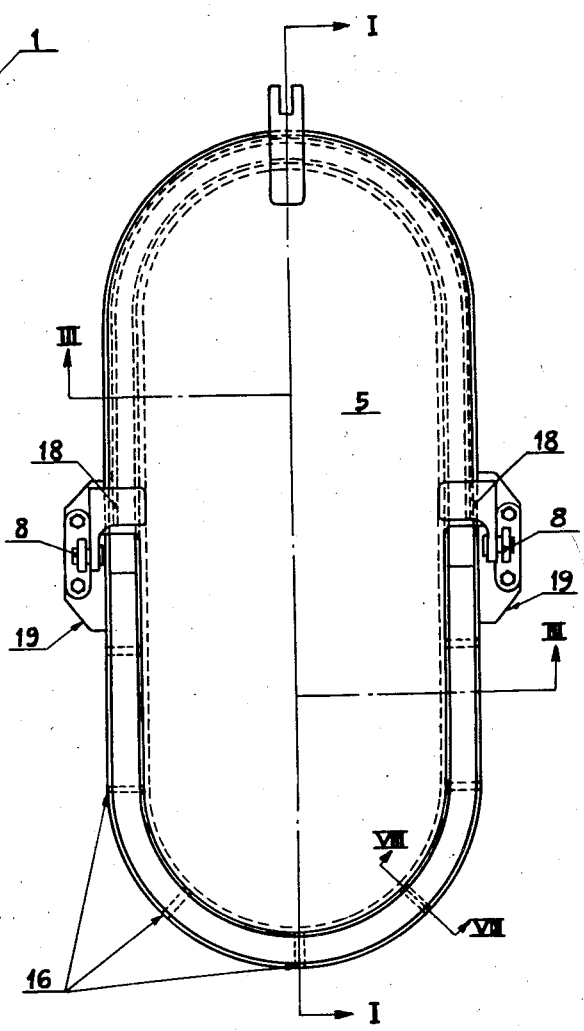
Figure 3:
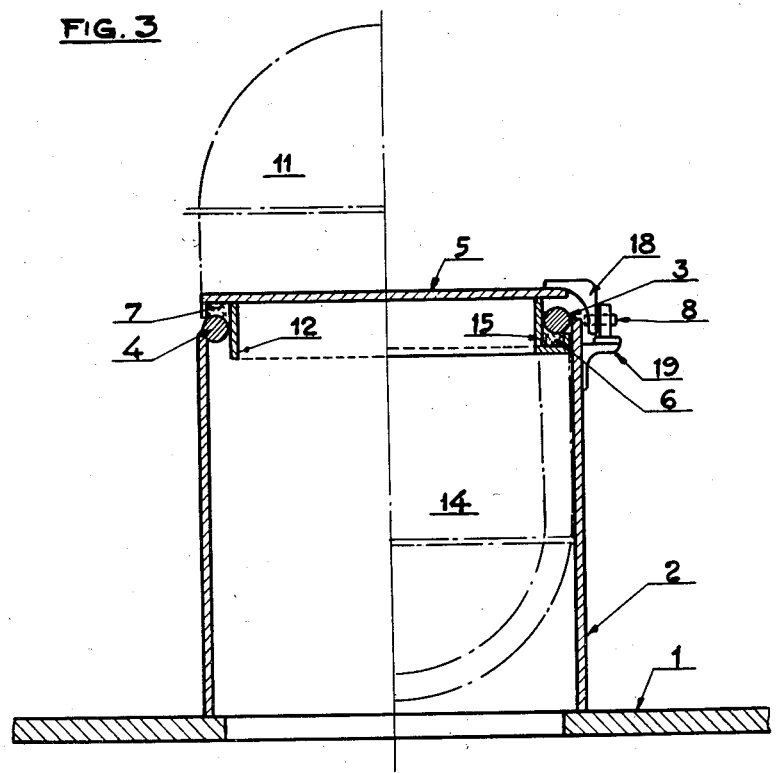

The above objects and advantages are attained by mechanism illustrated in the annexed drawing and applied to a hatchway cover for an oil tanker. Fig. 1 is a longitudinal sectional view of the cover, Fig. 2 a top view of the same, Fig. 3 a sectional view taken on the lines III—III of Fig. 2, Fig. 4 a section of the packing near one of the pivots, and Figs. 5–8 various sectional views of the coaming.

In the deck 1 of the ship there is provided an opening of the usual size and surrounded by a coaming 2. To the upper end of the coaming there are welded two round iron bars 3 and 4 which are located substantially at the same level as the upper face of the coaming. The iron bars serve as abutments for the packings 6 and 7, respectively, which are mounted in the cover 5. The cover is mounted on pivots 8 located midway of the longer sides of the coaming, and the cover is dimensioned such that one of its halves can be freely swung down into the space within the coaming.

Figure 4:
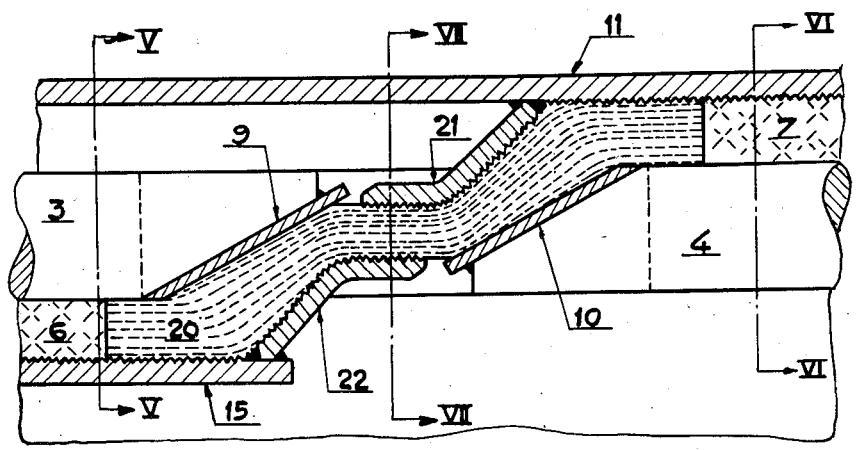

The iron bar abutments on the coaming are U-shaped and extend without interruption from one pivot to the opposite one. They have tapering ends which, as best seen from Fig. 4, are secured to plates 9 and 10 adapted to abut against the packings which at these places pass from the lower side of one abutment to the upper side of the other one.

The cover consists of a plane plate and an annular reinforcing member projecting downwardly from said plate immediately at the inside of the abutments of the coaming. The part 11 of the cover which is to be swung upward is sufficiently wide to cover the abutments on the coaming. The reinforcing member for this part of the cover consists of a vertical plate 12 which together with an outer sheet metal strip 13 forms a groove for the packing 7. In this part of the cover the packing engages the upper side of the round iron bar 4.

The other half 14 of the cover is of smaller width such that it can be turned downwards past the abutment on the coaming. The reinforcing member for this part of the cover consists of an L-shaped iron 15 which provides a groove for the packing 6 engaging the upper side of the iron bar 3. Since this half of the cover does not extend to the coaming, an open channel is formed between the abutment and the reinforcing member. In order to remove moisture which may collect in this open channel, the round iron bar has draining apertures at suitable places, as shown at 16 in Figs. 2 and 8. The cover is closed by means of a bolt 17 at the outermost part of the half 11 adapted to be turned upwards. The cover is supposed to be sufficiently rigid to ensure, by means of said bolt, a tight fit between the packings and the abutments round the entire opening. If desired, a second bolt may be provided at the other half as an additional precaution.

An important feature of the invention is the mounting of the cover on the pivots. The plane part of the cover is located entirely above the upper face of the coaming and is secured to two supporting members 18 which project downward outside the coaming. Secured to the coaming are two outwardly projecting brackets 19 which by means of the pivots 8 are connected with the supporting members 18 in such a way that the pivots will not come into contact with the cover and the coaming and, therefore, will not interfere with the movements of the cover.

Since the reinforcing member 12 directly merges into the web of the reinforcing member 15, the packings 6 and 7 for the two halves of the cover are in alignment with each other, but located at different levels. In order to connect the two packings and to obtain a tight seal at the places of the pivots, a supplemental packing 20 is inserted at these places of the cover. The packing 20 advantageously consists of a stronger material than the other packings and is directly connected thereto. At the ends of the wider half 11 of the cover and the L-shaped reinforcing member, the cover has fastening members 21 and 22 for the additional packing. For the sake of clearness, the cover parts to which the additional packing is secured are indicated by slightly corrugated lines in Fig. 4. As mentioned above, the rigid abutments on the coaming consist at this place of the bar 3 and plate 9 as well as the bar 4 and the plate 10.

The form of construction illustrated is merely an example of the invention the details of which may be modified within the scope of the appending claims. The size and general shape of the cover may be varied in accordance with requirements. In addition to ships, the invention may be applied to different kinds of store rooms or other containers having a vertical entry which is desired to be able to be closed in a simple manner. If for ventilation purposes of a tank it is desired to keep the cover in a partly open position, it may be provided with locking devices of any suitable kind which may be constructed such as to prevent persons or objects from falling down into the space in case the cover should unintentionally move into vertical position, for instance, if the locking bolt is accidentally disengaged.

What I claim is:

1. A device for covering an opening in a substantially horizontal wall, comprising a cover mounted for angular displacement about pivots having their axis located centrally across the opening, the halves of the cover on either side of said pivots being constructed to balance each other and to uncover the opening when the cover is in a vertical position with the lower half in the opening itself, packing means for the cover, a coaming surrounding the opening, abutments secured to said coaming for engagement with the cover and the packing means, the engaging faces of the cover being at one half located above the axis of the pivots and at the other half below said axis, and supporting members for said pivots, said supporting members projecting outwardly from the cover and the coaming, the pivots being located outwardly of said abutments to enable said packing means to extend without interruption past said pivots.

2. A device as set forth in claim 1 wherein said abutments are provided at the inside of the upper part of the coaming and extend without interruption from the pivot on one side of the coaming to the pivot at the opposite side, the ends of the abutments being tapered to permit passage of the packing means from the lower side of one abutment to the upper side of the other one.

3. A device as set forth in claim 1 wherein said abutments consist of round iron bars, and further comprising plates secured to the tapering ends of said bars and adapted to engage said packing means.

4. A device according to claim 1 wherein said cover comprises a plane plate and an annular reinforcing member projecting downwardly from said plate immediately at the inside of the abutments, said plane plate being shaped such that the half of the cover which is to be swung upward projects past the abutment on the corresponding part of the coaming, said plate being narrower at the other half of the cover so as to be able to be swung past the abutment on the corresponding part of the coaming.

5. A device as set forth in claim 1 and comprising a reinforcing member for the cover, and wherein said reinforcing member for one half of the cover consists of a single plate and the reinforcing member for the other half consists of an L-iron, the web of said iron merging into said plate, and the base of said iron extending outwardly below the appertaining abutment.

References Cited in the file of this patent
UNITED STATES PATENTS
2,729,185 Kummerman _____ Jan. 3, 1956